(12) United States Patent
Kraft

(10) Patent No.: US 7,390,031 B2
(45) Date of Patent: Jun. 24, 2008

(54) QUICK-CONNECT CONDUIT COUPLING DEVICE

(76) Inventor: Wayne J. Kraft, 7663 Cottonwood Mountain, Littleton, CO (US) 80127

( * ) Notice: Subject to any disclaimer, the term of this patent is extended or adjusted under 35 U.S.C. 154(b) by 0 days.

(21) Appl. No.: 11/194,769

(22) Filed: Aug. 1, 2005

(65) Prior Publication Data

US 2007/0024055 A1   Feb. 1, 2007

(51) Int. Cl.
F16L 19/02 (2006.01)
F16L 17/00 (2006.01)
F16L 33/22 (2006.01)
F16L 37/26 (2006.01)

(52) U.S. Cl. ............... 285/325; 285/326; 285/327; 285/95; 285/113

(58) Field of Classification Search ......... 285/325, 285/326, 327, 95, 103, 67, 10, 910, 205, 285/206, 208, 414, 415, 387, 388, 99, 109, 285/336, 356, 363, 364; 277/609, 616, 927
See application file for complete search history.

(56) References Cited

U.S. PATENT DOCUMENTS

| 33,430 | A | * | 10/1861 | Feyh | 285/327 |
|---|---|---|---|---|---|
| 98,131 | A | | 12/1869 | Ware | |
| 218,723 | A | | 8/1879 | Faust | |
| 653,143 | A | * | 7/1900 | Martin | 285/67 |
| 779,479 | A | | 1/1905 | Howell | |
| 784,848 | A | | 3/1905 | Fullipp | |
| 823,346 | A | * | 6/1906 | Maxwell | 285/325 |
| 942,047 | A | | 12/1909 | Atkinson | |
| 959,854 | A | | 5/1910 | Grierson | |
| 1,806,788 | A | * | 5/1931 | Cross et al. | 285/327 |
| 1,884,551 | A | * | 10/1932 | Boynton | 277/329 |
| 2,013,293 | A | * | 9/1935 | Snell et al. | 285/39 |
| 2,265,268 | A | * | 12/1941 | Culligan | 285/325 |
| 2,357,755 | A | * | 9/1944 | Moll | 220/3.94 |
| 3,260,539 | A | * | 7/1966 | Herron | 285/24 |
| 3,331,610 | A | * | 7/1967 | Olson | 277/641 |
| 3,365,215 | A | * | 1/1968 | Arzt et al. | 285/24 |
| 3,583,731 | A | | 6/1971 | Jewell | |
| 3,710,816 | A | * | 1/1973 | Prince | 137/242 |
| 3,851,898 | A | * | 12/1974 | Ihara | 285/24 |
| 4,070,045 | A | * | 1/1978 | Colter et al. | 285/325 |
| 4,103,712 | A | * | 8/1978 | Fletcher et al. | 137/637.05 |
| 4,564,041 | A | * | 1/1986 | Kramer | 137/315.01 |
| 4,617,012 | A | * | 10/1986 | Vaillancourt | 604/29 |
| 4,993,720 | A | * | 2/1991 | Ciotola | 277/641 |
| 5,700,041 | A | * | 12/1997 | Andre et al. | 285/325 |
| 5,788,291 | A | | 8/1998 | Williams et al. | |

* cited by examiner

Primary Examiner—Robert J. Sandy
Assistant Examiner—Jay R Ripley
(74) Attorney, Agent, or Firm—McDermott Will & Emery LLP

(57) ABSTRACT

A coupling device for releasably interconnecting conduit elements includes two coupling members, each having a central opening therethrough. A tapered pocket is defined in one coupling member to act as a seat for slidingly receiving the other coupling member, which is in the form of a wedge-like element. An alignment mechanism ensures complete engagement between the two coupling members. Two annular grooves are disposed opposite each other about the central openings of the respective coupling members. A gasket is disposed in one of the grooves for engaging the opposite groove when the coupling members are fully interengaged. The gasket has a first annular portion of a compressible resilient material for positioning in one annular groove, and a second annular portion extending from the first annular portion, of a less compressible material, for compression into the first annular gasket portion as the coupling members are being interengaged.

39 Claims, 4 Drawing Sheets

QUICK-CONNECT CONDUIT COUPLING DEVICE

BACKGROUND OF THE INVENTION

1. Field of the Invention

The present invention relates generally to flanges for connecting pipes and conduits and, more particularly, to coupling devices for interconnecting such conduits in the field. Specifically, the present invention relates to a quick-connect coupling device for making rapid and reliable pipe connections.

2. Description of the Prior Art

There are numerous different types of flange and connection devices and assemblies designed to interconnect the ends of opposing pipes and hose. Such connection flanges must be adapted for use in the field to make tight connections that will withstand the internal pressures of the fluids traveling through the pipes. It is important that these connections be made quickly and reliably. Moreover, such connections need to be tight and aligned properly to ensure smooth fluid flow through the piping system without leaking at the joint. Examples of typical pipe flanges and connection devices are illustrated in U.S. Pat. Nos. 98,131, 218,723, 779,479, 784,848, 823,346, 942,047, 959,854, 2,265,268, 3,583,731 and 5,788,291.

Rotating cams and attachment bolts and rings have been used in numerous flange designs to insure positive locking and tight fitting joints. Unfortunately, these devices are not particularly suited to rapid attachment. Moreover, a great deal of effort becomes necessary to align such flanges to insure that flange faces are parallel and the bolt holes are aligned. Once aligned, bolts and nuts are then tightened until the flanges are drawn together tight enough to displace a gasket disposed between the flanges to attempt to provide a leak-proof seal. Improper alignment or unbalanced joint pressures can result from such attachment structures and methods. As a result, the pipe joints are not necessarily reliable over the long term and can leak or fail under higher fluid pressures or improper field installation.

In addition to the above, typical gasket arrangements for such flanges are susceptible to twisting and unseating during the process of attaching two flange portions together. Consequently, the gaskets may not remain completely seated for sealing purposes once the flanges are secured together. This can also be a source of leakage and failure. Accordingly, there remains a need in the industry for a device that can make fast, cost-effective pipe connections as well as a device capable of connecting any and all other appliances associated with piping systems to the piping conduit to permit quick pipe assembly, disassembly or replacement. Moreover, there remains a need for such a device which is reliable and easy to use, and the present invention addresses and solves these particular problems in the art.

SUMMARY OF THE INVENTION

Accordingly, it is one object of the present invention to provide an improved coupling device for rapidly and releasably connecting conduit or pipe elements.

It is another object of the present invention to provide a quick connect coupling device for interconnecting conduit elements in a manner that will prevent long term failure yet permit easy replacement if necessary.

Yet another object of the present invention is to provide a quick-connect device for pipe conduit that has an improved gasket seal arrangement which prevents gasket rolling and unseating during the process of pipe connection.

Still another object of the present invention is to provide a pipe flange device having near perfect pipe alignment and capability of sealing against high fluid pressure without the use of attachment connecting bolts to maintain the component portions together.

To achieve the foregoing and other objects and in accordance with the purpose of the present invention, as embodied and broadly described herein, a coupling device is disclosed for releasably interconnecting conduit elements. The device includes a first coupling member having a first central opening therethrough, and a second coupling member having a second central opening therethrough. The second coupling member is sized and shaped to slidingly engage the first coupling member. A first collar element is coaxial with the first central opening and extends outwardly from the first coupling member. A second collar element is coaxial with the second central opening and extends outwardly from the second coupling member in a direction opposite that of the first collar element when the coupling members are interengaged. A tapered pocket is defined in the first coupling member to act as a seat for slidingly receiving the second coupling member, the second coupling member being substantially in the form of a wedge-like element. An alignment mechanism is disposed in the upper portions of, respectively, the first and second coupling members. The alignment mechanism is adapted to ensure complete engagement between the first and second coupling members. First and second annular grooves are disposed opposite each other about the central openings in the first and second coupling members. A gasket element is disposed in one of the annular grooves and is adapted to engage the opposite annular groove when the first and second coupling members are fully interengaged with each other. The gasket element has first and second annular portions. The first annular gasket portion is of a first compressible resilient material and sized and shaped for positioning in one annular groove. The second gasket annular portion extends outwardly from the first gasket portion and is made of a second less compressible material than the first gasket portion. The second gasket portion is adapted for compression into the first annular gasket portion as the first and second coupling members are being interengaged.

In one application of the invention, the first and second collar elements of the coupling device are integral components of, respectively, the first and second coupling members. In another application, the first and second collar elements are separate components carried by, respectively, the first and second coupling members.

In one modification of the invention, the first coupling member pocket is defined by a pair of sloping side shoulders converging angularly downwardly toward each other from an open upper portion, a bottom surface interconnecting the lower ends of the side shoulders, an inner pocket surface extending between the side shoulders, and a substantially U-shaped ledge portion extending along the side shoulders and bottom edge to define an outer surface opening spaced from the inner pocket surface. In another modification, the second coupling member includes an inner surface, an outer surface, and side portions in the form of tapered flanges sized and shaped to fit within the first coupling member pocket cammed against the sloping shoulders to removably engage the second coupling member within the first coupling member. In this form, the second coupling member inner surface slidingly engages the pocket inner surface, with the second collar element extending outwardly through the pocket outer surface opening.

In one application of this modification, the first and second coupling members each include, respectively, a central socket disposed about the respective first and second central openings. In this application, the first collar portion is in the form of a cylindrical member having a circumferential annular shoulder disposed at one end thereof. The shoulder is sized to engage the first coupling member central socket and axially terminate in an inner annular end surface substantially planar with the pocket inner surface. Similarly, the second collar portion is in the form of a cylindrical member having a circumferential annular shoulder disposed at one end thereof sized to engage the second coupling member central socket and axially terminating in a second collar inner annular end surface substantially planar with the second coupling member inner surface.

In still another application of the invention, the first and second annular grooves are disposed, respectively, in the first collar portion inner annular end surface and the second collar portion inner annular end surface, the annular end surfaces abutting each other when the second coupling member is fully engaged within the first coupling member pocket.

In a further modification of this invention, the first annular groove is substantially rectilinear or square-shaped in cross-section, while the second annular groove is substantially V-shaped in cross-section. In one application of this modification, the first gasket portion is sized and shaped to fit within the substantially square-shaped first annular groove, and the second gasket portion includes a semi-circular outer curved surface projecting from the first gasket portion for engagement with both surfaces of the V-shaped second annular groove when the first and second coupling members are fully interengaged with each other.

In yet another application of the invention, the first gasket portion includes a central annular chamber defined therewithin to enable it to collapse to receive the second gasket portion as the second coupling member is being slidingly interengaged with the first coupling member. The first gasket portion has sufficient elasticity to rebound and bias the second gasket portion into the second annular V-shaped groove upon complete engagement of the second coupling member with the first coupling member to seal the first and second collar portions together.

In still a further application of the invention, the device of the present invention further includes a flat bottom surface and an upper portion that includes a rounded mounting bracket having a mounting aperture for hanging or affixing said device.

In another application, the alignment mechanism of the device is in the form of a pair of alignment apertures disposed in a portion of, respectively, the first and second coupling members, and a single alignment pin. The alignment apertures are coaxial and adapted to receive the alignment pin therethrough only when the first and second coupling members are fully interengaged.

Another modification of the invention is in the form of a quick-connect coupling device for releasably interconnecting first and second conduit elements. The coupling device includes a first coupling component having a front surface, a rear surface, an upper portion, a lower portion, a pair of side portions and a first central opening therethrough. A first collar portion is provided coaxial with the first central opening and extending outwardly from the first coupling component front surface, the first collar portion having an annular inner end surface. A wedge-shaped slot is defined in the first coupling component by a pair of sloping shoulders tapering angularly downwardly toward each other from the first coupling component upper portion.

A second coupling component is also provided and has a front surface, a rear surface, an upper portion, a lower portion, a pair of side portions and a second central opening therethrough. The side portions are in the form of tapered flanges sized and shaped to fit within the wedge-shaped slot of the first coupling component against the sloping shoulders to removably engage the second coupling component within the first coupling component. A second collar portion, coaxial with the second central opening, extends from the second coupling component rear surface. The second collar portion has an annular inner end surface which substantially abuts the annular inner end surface of the first collar portion when the second coupling component is fully engaged with the first coupling component. A pair of alignment apertures are disposed in the upper portions of, respectively, the first and second coupling components. The alignment apertures are coaxial when the first and second coupling components are fully interengaged, and a single alignment pin is provided for removable attachment through the alignment apertures to ensure full engagement between the first and second coupling components upon assembly of the device. First and second annular grooves are disposed, respectively, in the annular inner end surfaces of the first and second collar portions, and a gasket element is disposed in the annular grooves to seal the collar portions and the first and second coupling components upon assembly of the device.

Finally, another modification of the invention is in the form of a quick-connect coupling device for releasably interconnecting first and second conduit elements. The coupling device includes a female coupling component having a front surface, a rear surface, an upper portion, a lower portion, a pair of side portions and a first central opening therethrough. A first collar portion is coaxial with the first central opening and extends outwardly from the female component front surface, the first collar portion having an annular inner surface. A wedge-shaped pocket is defined in the female component by a pair of sloping side shoulders converging angularly downwardly toward each other from an open upper portion, a bottom surface interconnecting the lower ends of the side shoulders, an inner pocket surface extending between the side shoulders, and a substantially U-shaped ledge portion extending along the side shoulders and bottom edge to define an outer surface opening spaced from the inner surface.

A male coupling component is also provided and has a front surface, a rear surface, an upper portion, a lower portion, a pair of side portions and a second central opening therethrough. The side portions are in the form of tapered flanges sized and shaped to fit within the wedge-shaped pocket of the female component and cammed against the sloping shoulders to removably engage the male component within the female component, the male component inner surface slidingly engaging the pocket inner surface. A second collar portion is coaxial with the second central opening and extends from the male component rear surface outwardly through the female component pocket outer surface opening when the male component is interengaged with the female component. The second collar portion has an inner annular surface substantially congruent with and abutting the inner annular surface of the first collar portion when the male component is engaged with the female component. A pair of alignment apertures are disposed in the upper portions of, respectively, the male and female components, the alignment apertures being coaxial when the male and female components are fully interengaged. A single alignment pin is provided for removable attachment through the alignment apertures to ensure full engagement between the male and female coupling components upon assembly of the device. First and second annular grooves are disposed, respectively, in the inner annular surfaces of the first and second collar portions. Finally, a gasket element is disposed in one of the annular grooves and is adapted to engage the other annular groove when the male and female components are interengaged with each other. The gasket element has a first annular portion sized and shaped for positioning in one of the annular grooves and is made of a compressible resilient material. A second annular portion extends outwardly form the first annular portion and is made of a lesser compressible material than the first annular portion. The second annular portion is adapted for compression into the first annular portion as the male component is being engaged with the female component.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DETAILED DESCRIPTION OF THE PREFERRED EMBODIMENTS

Figure 1:
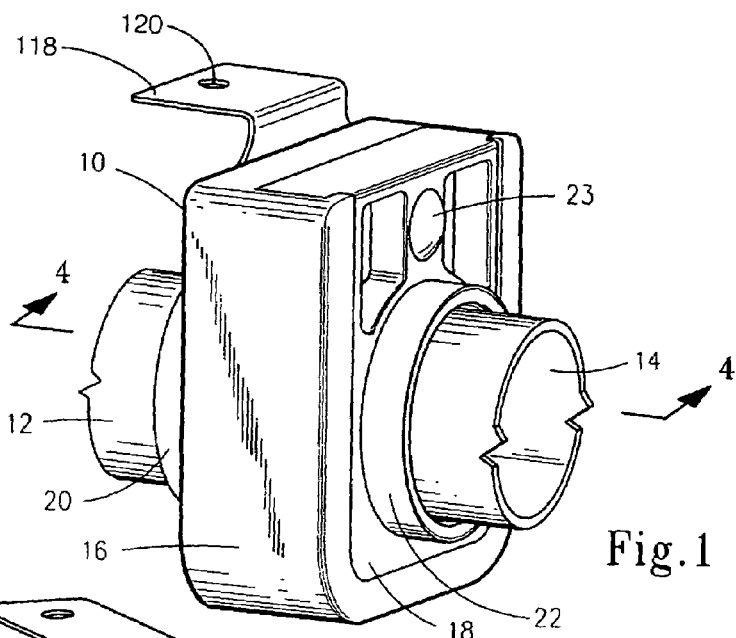
FIG. 1 is a front perspective view of one embodiment of a quick-connect coupling device constructed in accordance with the present invention and secured to a pair of conduit elements.
Figure 2:
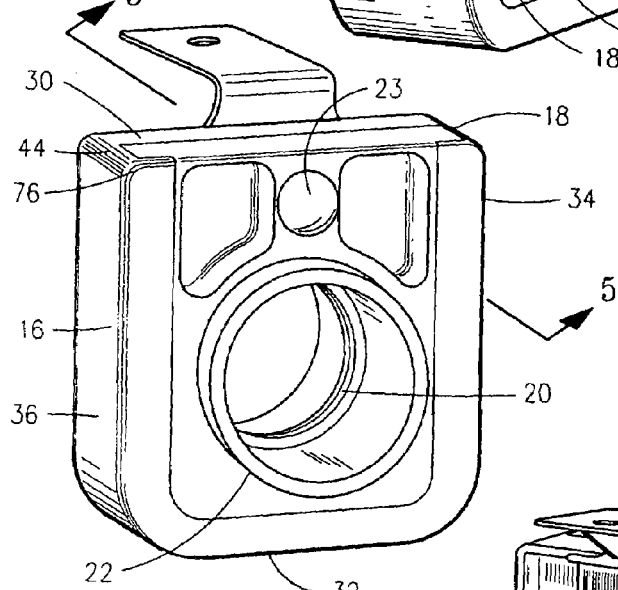
FIG. 2 is a front perspective view of the same embodiment of FIG. 1 but unsecured to conduit elements.
Figure 3:
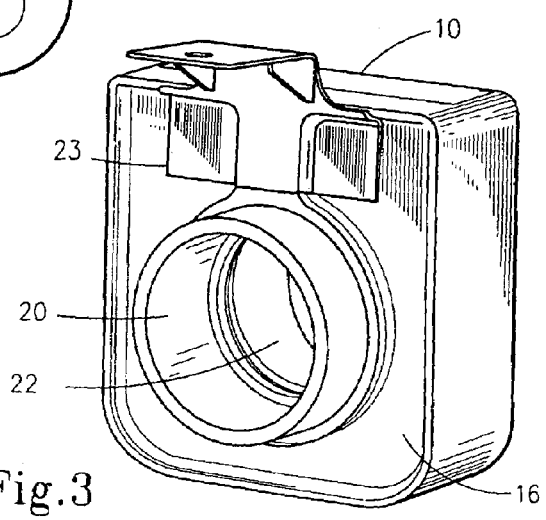
FIG. 3 is a rear perspective view of the embodiment of FIG. 2.
Figure 4:
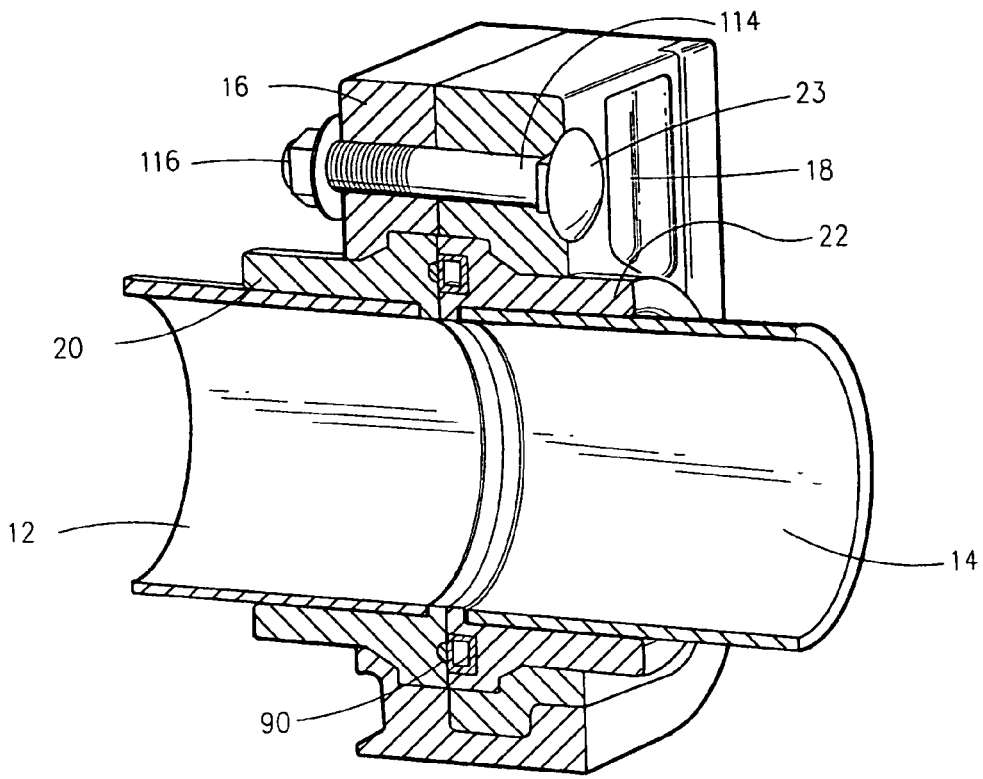
FIG. 4 is a cross-sectional view taken substantially along line 4-4 of FIG. 1.
Figure 5:
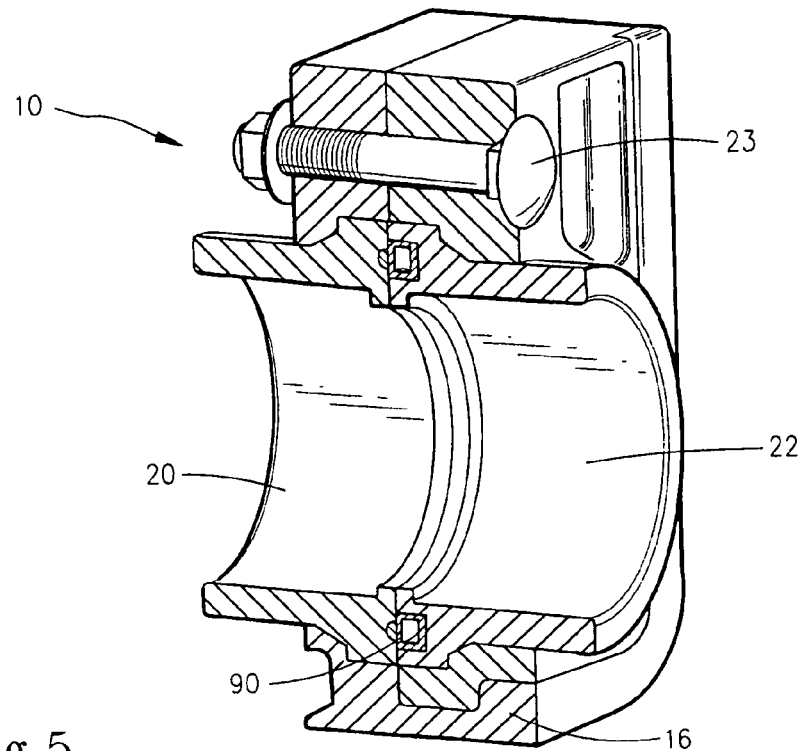
FIG. 5 is a cross-sectional view taken substantially along line 5-5 of FIG. 2.
Figure 6:
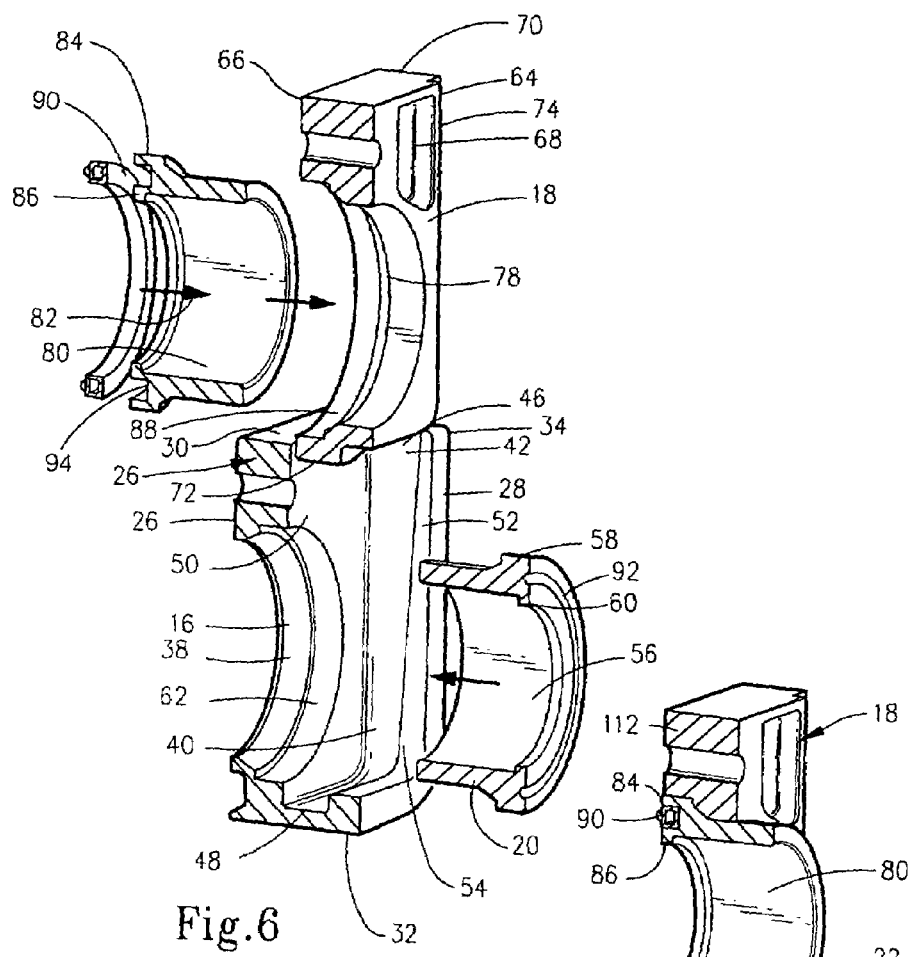
FIG. 6 is an exploded view illustrating the separated components of the embodiment illustrated in FIG. 2 before assembly thereof.

Referring initially to FIGS. 1-3, the present invention is directed to a coupling device 10 that is designed to provide quick interconnection between a pair of conduit elements 12, 14, such as pipes, hose and the like. The device 10 is particularly useful as a quick-connect coupling for PVC piping in field locations. The primary purpose of the device 10 is to provide a new, fast and cost-effective technique to make pipe connections. The device 10 is also adaptable to connect any and all appliances associated with piping systems to the piping conduit so it may be easily removed or replaced. While a specific preferred embodiment will be disclosed and discussed herein, it should be understood that the invention is not to be so limited but is to be interpreted in accordance with the full scope appended claims.

The device 10 preferably includes a first or female member 16 that is adapted for connection to one conduit element 12, and a second or male member 18 that is adapted for connection to another conduit element 14. The first or female member 16 is sized and shaped to slidingly and tightly receive the second or male member 18 therein. In this manner, the female member 16, secured to a conduit element 12, and the male member 18, separately secured to a conduit element 14, may be interjoined with each other to thereby interconnect the conduit elements 12, 14. The first and second members 16, 18 preferably include, respectively, collars 20 and 22 extending outwardly therefrom and adapted for respective connection to conduits 12, 14. The conduit elements 12, 14 may be secured to the collars 20, 22 in any desired manner and are preferably cemented. An alignment system 23, discussed in greater detail below, is provided to insure that the first and second members 16, 18 with their respective conduits 12, 14 are fully engaged and in precise alignment. The structural components of the device 10, as more particularly discussed below, may be made from any desired material appropriate to the environment in which the device 10 will be used, including plastics, metals and the like. In preferred form, however, the components of the device 10 are polyvinyl chloride plastic.

Referring more particularly to FIGS. 1-8, the first or female member 16 preferably includes a first block structure 24 having a front surface 26, a rear surface 28, an upper portion 30, a lower portion 32, a pair of side portions 34, 36 and a first central opening 38 aligned axially therethrough. As previously indicated, the first block structure 24 is preferably made from polyvinyl chloride (PVC). In preferred form, the top portion 30, the bottom portion 32 and the respective side portions 34, 36 include substantially flat surfaces so that the device 10 can be readily placed or mounted on a flat surface or against a sidewall.

A slot or pocket 40 is preferably formed in the first block structure 24 proximate the rear surface 28 thereof and is sized and shaped to receive the second or male member 18 therein. The slot 40 is preferably defined by a pair of tapered interior surfaces 42, 44 that converge angularly downwardly toward each other from an open upper portion 46 toward a bottom surface 48. This creates a wedge-like slot shape that is wider at its upper portion 46 and narrower toward the bottom surface 48. An inner pocket surface 50 is defined by the slot 42, and a substantially U-shaped ledge portion 52 extends along the tapered surfaces 42, 44 and the bottom surface 48. The U-shaped ledge portion 52 forms the inner surface 34 of the first block structure 24 as well as defines a U-shaped outer surface opening 54 spaced from the interior pocket surface 50.

The first collar 20, which extends axially outwardly from the front surface 26 of the female member 16, may be an integral portion of the first block structure 24. Alternatively, and in the preferred and illustrated form, the collar 20 may be a separate cylindrical element 56 which may be readily inserted into the first block structure 24. In preferred form, the cylindrical element 56 includes an annular shoulder 58 which extends radially outwardly therefrom at the interior surface 60 thereof. An annular socket 62 surrounds the central opening 38 inwardly of the front surface 26 of the first block structure 24. In this manner, the cylindrical collar element 56 is sized to snugly fit through the central opening 38 and extend outwardly from the front surface 26. The annular shoulder 58 seats in the socket 62 to snugly maintain the element 56 within the first block structure 24, the interior surface 60 of the cylindrical element 56 being substantially planar with the inner pocket surface 50 when the element 56 is firmly seated in the socket 62.

The second or male member 18 includes a second block structure 64, also preferably made from PVC. The second block structure 64, in preferred form, includes an inner surface 66, an outer surface 68, a top portion 70, a bottom portion 72, a pair of side surfaces 74, 76, and a second central opening 78 which is coaxial with the first central opening 38 of the female member 16 when the device 10 is in its fully assembled condition. The side surfaces 74, 76 are preferably tapered and sized and shaped to cam against the converging interior surfaces 42, 44 of the slot 40 in the first block structure 24 when the male member 18 is engaged within the female member 16. In this manner, the block structure 64 is generally wedge-shaped to snugly force fit within the slot or pocket 40 of the female member 16, the inner surface 66 engaging the inner pocket surface 50.

As in the female member 16 arrangement, the second collar 22, which extends axially outwardly from the outer surface 68 of the male member 18, may be an integral portion of the second block structure 64. Alternatively, and in the preferred and illustrated form, the collar 22 may be a separate cylindrical element 80 which is readily inserted into the second block structure 64 in the direction indicated by the arrow 82. In preferred form, the cylindrical element 80 includes an annular shoulder 84 which extends radially outwardly therefrom at the interior surface 86 thereof. An annular socket 88 surrounds the central opening 78 inwardly of the inner surface 66 of the second block structure 64. In this manner, the cylindrical collar element 80 is sized to snugly fit through the central opening 78 and extend outwardly from the outer surface 68. The annular shoulder 84 seats in the socket 88 to snugly maintain the element 80 within the second block structure 64, the interior surface 86 of the cylindrical element 80 being substantially planar with the inner surface 66 of the second block structure 64 when the element 80 is firmly seated in the socket 88.

Figure 7:
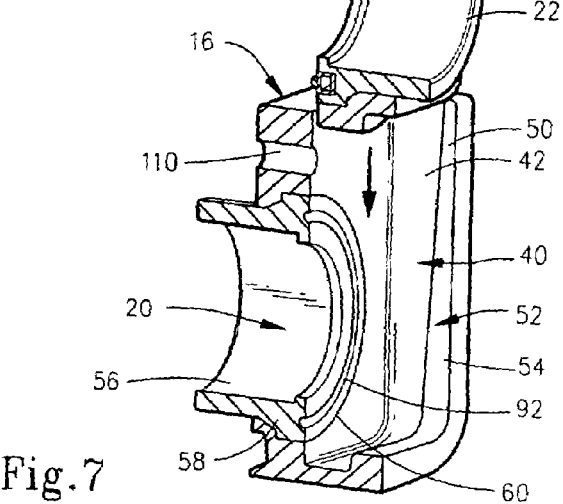
FIG. 7 is an exploded view illustrating the components of the embodiment illustrated in FIG. 2 in partial assembled condition.
Figure 8:
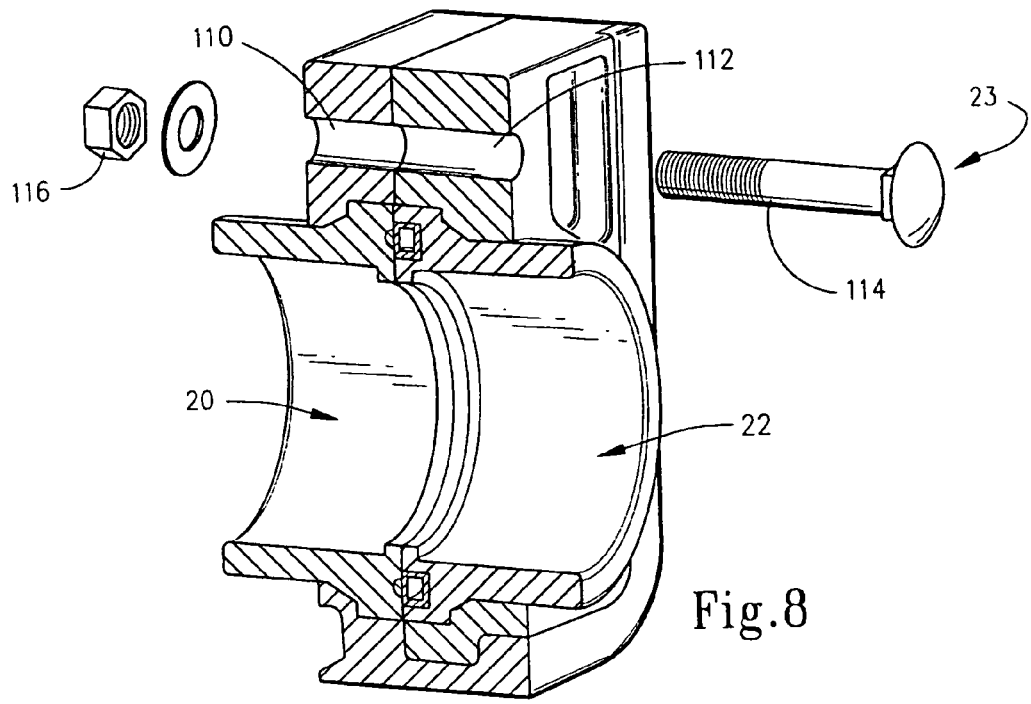
FIG. 8 is a perspective view, with some parts exploded, of the assembled embodiment of FIG. 7 but illustrating the alignment pins in spaced position for installation.

FIG. 7 illustrates the first and second block structures 24, 64 with their respective collar elements 56, 80 inserted therein, poised for sliding interengagement to join the second or male member 18 with the first or female member 16. As described above, this interengagement action is a physical force fit with the side surfaces 74, 76 of the wedge-shaped male member 18 camming against the converging interior surfaces 42, 44 of the slot 40 in the female member 16. Since the interconnected conduits 12, 14 carry fluid under pressure, it is imperative to ensure that the seal between the members 16, 18 is fluid tight.

To achieve this seal and with particular reference to FIGS. 6-10, a gasket element 90 is provided between the two members 16, 18. The gasket element 90 may be made from any elastomeric material that will stay in position and is appropriate for the environment in which the device 10 is to be used. The preferred material for the gasket element 90 is ethylene propylene diene monomer (EPDM) rubber. To secure the gasket element 90 in place and in preferred form, the first collar element 56 includes a first annular groove 92 disposed in the interior surface 60 thereof, while the second collar element 80 includes a second annular groove 94 disposed in the interior surface 86 thereof. The grooves 92, 94 are positioned in their respective collar elements 56, 80 so that they are directly opposite each other with their center lines precisely aligned when the male member 18 is fully engaged within the female member 16. The grooves 92, 94 are sized and shaped to receive and hold the gasket element 90 therebetween, and the gasket element 90 is thus designed to seal the connection between the male and female members 18, 16.

When the members 16, 18 are being interengaged, the two block structures 24, 64 are moving against each other in opposite directions. This creates counter-frictional forces coacting on the gasket 90. Consequently, while a variety of gasket element arrangements may be utilized with the present invention, the gasket 90 must be designed so that the gasket 90 is not rolled or pushed out of position by these frictional forces. Therefore and in preferred form, the gasket 90 of the present invention includes two portions. A first or base annular portion 96 is sized and shaped to fit within one of the grooves 92, 94 and is of a first compressible material, preferably approximately 100-125 durometer ethylene propylene diene monomer (EPDM) rubber. A second annular portion 98 extends axially outwardly from the gasket base portion 96 and is made of a second lesser compressible material than the base portion 96, preferably approximately 65-80 durometer ethylene propylene diene monomer (EPDM) rubber. The second annular portion 98 is sized to fit within the other opposite groove 92, 94. In this manner, the second portion 98 compresses into the base portion 96 as the members 16, 18 are in the process of being interengaged. Once the members 16, 18 are in their final fully engaged position, the base portion 96 urges the second portion 98 outwardly and into its respective groove.

Figure 9:
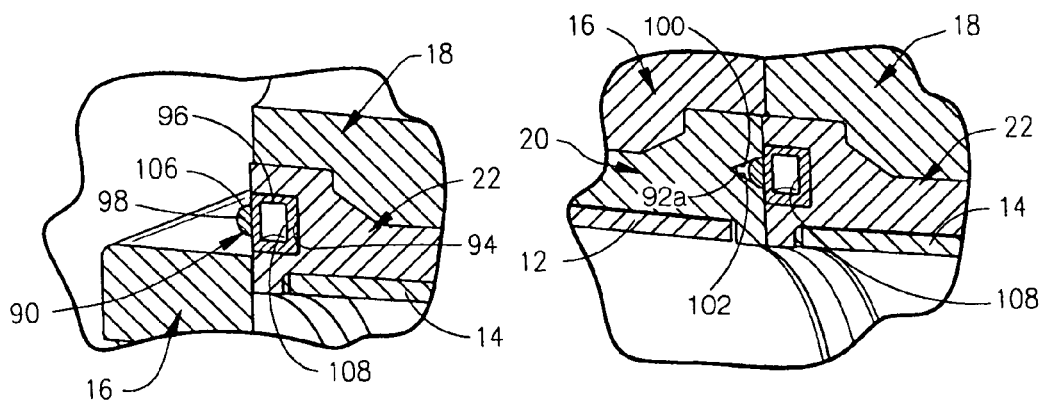
FIG. 9 is an enlarged, partial sectional view of the gasket arrangement of the present invention in an unassembled position.
Figure 10:
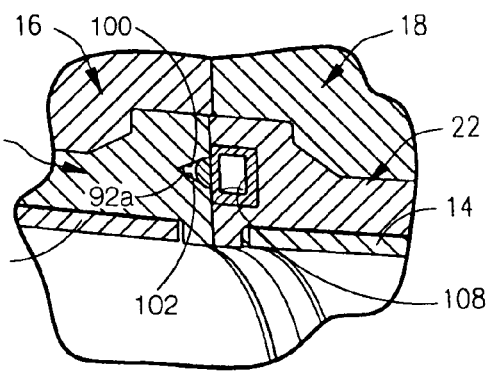
FIG. 10 is an enlarged, partial sectional view of the gasket arrangement of FIG. 9 but illustrating the gasket arrangement in a fully seated condition when the components of the present invention have been fully assembled.

In preferred form, as shown in FIGS. 9 and 10, the first annular groove 92*a* is in the form of a "V" shape having two surfaces 100, 102. The second annular groove 94 is preferably in the form of substantially square-shaped cross-section channel. Accordingly, the first or base gasket portion 96 is preferably square-shaped to snugly fit within the square channel-shaped groove 94, the square shape providing substantially greater contact area than a round shape as is typical in standard O-ring arrangements. The second gasket portion 98 is preferably a rounded member having a semi-circular outer surface 106 extending outwardly from the square-shaped base gasket portion 96. In the most preferred form, the square-shaped base portion 96 is hollow and includes a central annular chamber 108 extending throughout its interior. In this manner, the rounded second gasket portion 98 is readily compressed into the chamber 108 of the base gasket portion 96 during the process of fitting the male member 18 into the female member 16. Once the members 16, 18 are in their fully engaged position, the grooves 92*a*, 94 are opposite each other. The base gasket portion 96 then rebounds to urge the second gasket portion 98 with its semi-circular outer surface 106 into the V-shaped first groove 92*a*. When this occurs, the semi-circular outer surface 106 of the gasket portion 98 fully engages both V-shape surfaces 100, 102. In one embodiment, the semi-circular outer surface 106 may include a silicone finish to reduce resistance as the male and female members 18, 16 are pushed together. Moreover, the rebound action of the base gasket portion 96 may result from the elastomeric nature of the material of the base portion, or it may be the result of some sort of pneumatic or hydraulic impulse force to urge the second gasket portion 98 to its sealed position in the V-shaped first groove 92*a*.

As a result of the above gasket arrangement, the gasket 90 is not rolled or pressed out of position by the counter-frictional forces coacting on the gasket 90 as the male member 18 is being inserted into the female member 16. Moreover, the fully engaged position of the device 10 is insured only when the gasket 90 has expanded to urge the semi-circular outer surface 106 of the gasket portion 98 into the V-shape groove 92*a* and engage both surfaces 100, 102.

The final objective of the gasket 90 is to be constructed from preferred materials that will stay in position in either the male member 18 or the female member 16 and will not interfere with the field assembly of the two members. Due to the arrangement provided by the present invention, the gasket element 90 is not pinched, scarred or in any other way damaged during assembly or disassembly. It also allows the joint of the device 10 to hold a working pressure of at least 175 psig and maintains all of its design criteria for a period of not less than 50 years. Finally, it does not hold any electromagnetic charge, either positive or negative.

To insure that the male member 18 is fully engaged within the female member 16 so that the collar elements 20, 22 are co-axial and the gasket element 90 is in its proper position, an alignment system 23 is provided. In preferred form, the alignment system 23 includes a pair of apertures 110, 112 disposed, respectively, in the upper portions of the first and second block structures 24, 64. When the male member 18 is fully engaged within the female member 16 so that the gasket element 90 is in its proper position, the apertures 110, 112 are coaxial and congruent. An alignment pin 114 is provided and is sized for a precise fit within the coaxial apertures 110, 112. An attachment nut 116 is utilized to secure the free end of the pin 114 after it passes through the coaxial apertures 110, 112. Perfect alignment of the device 10 is achieved via the pin 114 which passes through the male member aperture 112 until it reaches its end of travel through the female member aperture 110. This forms a perfect alignment of the two members 16, 18. It also assures precise alignment for proper placement and fitting of the gasket element 90. However, the pin 114 is not utilized to hold the members 16, 18 together. Rather, it is the V-shape of the groove 92 that holds the device 10 together, not the alignment pin 114.

The alignment system 23 also keeps the female and male members 16, 18 from sliding out and disengaging due to fluid vibration, mechanical twisting of the parts and the like. In one preferred form, a quick connect or self-locking fastener may be used as pin 114. One example of such a fastener is the Permanentech fastener by Permanent Technologies, Inc. In this manner, the pin 114 may not be inadvertently removed.

As described above, the member 16 has flat side and bottom surfaces so that the device 10 can be set or mounted on a ground surface or against a wall surface. In one embodiment illustrated in FIG. 1, a mounting bracket 118 may be secured to the female portion 16 at the upper surface 30. The bracket 118 includes an opening 120 so that the bracket 118 may be hung from a ceiling surface, thereby hanging the device 10 and its conduits 12, 14.

Figure 11:
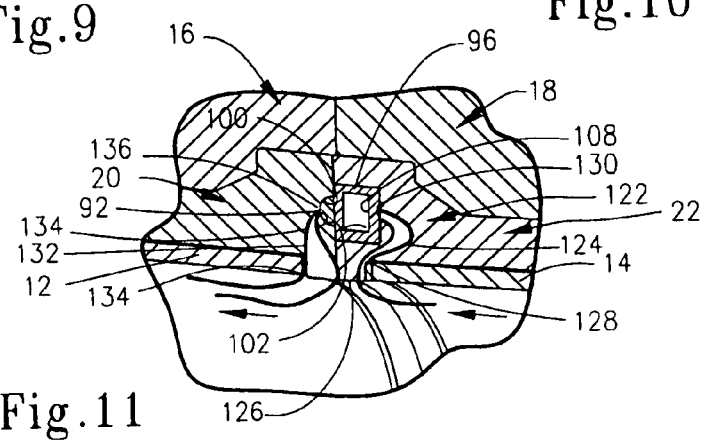
FIG. 11 is an enlarged, partial sectional view substantially similar to that of FIG. 10 but illustrating a pressure enhancement system incorporated therein.

In an alternate embodiment as illustrated in FIG. 11, a pressure differential enhancement system 122 is illustrated. The system 122 is designed to increase the pressure on the gasket 90 to enhance the seal created thereby. The system 122 is also capable of creating a pressure difference or differential across the junction between the conduit elements 14, 12. To accomplish this, a first duct 124 is provided between the radially inwardly annular edge 126 of the collar 22, and the bottom surface of the chamber 108. The duct 124 is preferably tapered so as to have a larger inlet opening 128 and a narrower outlet opening 130. In this manner, when fluid moves from the conduit element 14 into the conduit element 12, a small portion of the fluid is also directed into the first duct 124 to push against the gasket 96 in the chamber 108 to increase sealing pressure.

Likewise, a $2^{nd}$ duct 132 is provided between the inner annular edge 134 of the conduit element 12 and the end 134 proximate the apex of the "V" notch 92. In this instance, the duct 132 is also tapered so that the inner opening 136 of the duct 132 is narrower than the outer opening 134. This arrangement creates a vacuum on the second duct 132 when fluid passes from element 14 into element 12 and goes by the outer opening 134. This vacuum co-operates with the increased pressure in the $1^{st}$ duct 124 to further enhance the sealing capability of the gasket 90. Finally, the ducts 124, 132 can be used to create a fluid pressure differential across the joint between the two conduit elements 12, 14 which may be useful in numerous applications.

As can be seen from the above, the present invention provides a coupling device that enables quick connection of a pair on conduit elements in the field. The device relies on a wedge-shaped mechanical fit and a unique gasket sealing arrangement to insure proper and tight fit between the conduit elements. An alignment system assures a precise alignment for proper placement and fitting of the coupling component members. The present invention provides a quick-connect coupling device for making rapid and reliable pipe connections, and permits the connection to be placed in any desired location, such as on a floor surface, against a wall surface or hung from a ceiling.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A coupling device for releasably interconnecting conduit elements, said coupling device comprising:
   a first coupling member having a first central opening therethrough;
   a second coupling member having a second central opening therethrough, said second coupling member being sized and shaped to slidingly engage said first coupling member,
   a first collar element coaxial with said first central opening and extending outwardly from said first coupling member;
   a second collar element coaxial with said second central opening and extending outwardly from said second coupling member in a direction opposite that of said first collar element when said coupling members are interengaged;
   a tapered pocket defined in said first coupling member to act as a seat for slidingly receiving said second coupling member, said second coupling member being substantially in the form of a wedge;
   an alignment mechanism disposed in upper portions of, respectively, said first and second coupling members, said alignment mechanism adapted to ensure complete engagement between said first and second coupling members;
   first and second annular grooves disposed opposite each other about the central openings in said first and second coupling members; and
   only one single-piece gasket element disposed in one said annular groove and adapted to directly engage the opposite annular groove when said first and second coupling members are fully interengaged with each other, said gasket element having a first and second annular portions, said first annular portion being of a first compressible resilient material and sized and shaped for positioning in one said annular groove, and said second annular portion extending outwardly from said first annular portion and being of a second less compressible material than said first annular portion adapted for compression into said first annular gasket portion as said first and second coupling members are being interengaged.

2. The coupling device as claimed in claim 1, wherein said first and second collar elements are integral components of, respectively, said first and second coupling members.

3. The coupling device as claimed in claim 1, wherein said first and second collar elements are separate components carried by, respectively, said first and second coupling members.

4. The coupling device as claimed in claim 1, wherein said first coupling member pocket is defined by a pair of sloping side shoulders converging angularly downwardly toward each other from an open upper portion, a bottom surface interconnecting the lower ends of said side shoulders, an inner pocket surface extending between said side shoulders, and a substantially U-shaped ledge portion extending along said side shoulders and bottom edge to define an outer surface opening spaced from said inner surface.

5. The coupling device as claimed in claim 4, wherein said second coupling member comprises an inner surface, an outer surface, and side portions in the form of tapered flanges sized and shaped to fit within said first coupling member pocket cammed against said sloping shoulders to removably engage said second coupling member within said first coupling member, said second coupling member inner surface slidingly engaging said pocket inner surface with said second collar element extending outwardly through said pocket outer surface opening.

6. The coupling device as claimed in claim 5, wherein said first and second coupling members each include, respectively, a central socket disposed about said respective first and second central openings, wherein said first collar element comprises a cylindrical member having a circumferential annular shoulder disposed at one end thereof sized to engage said first coupling member central socket and axially terminating in an inner annular end surface substantially planar with said pocket inner surface, and wherein said second collar element comprises a cylindrical member having a circumferential annular shoulder disposed at one end thereof sized to engage said second coupling member central socket and axially terminating in a second collar inner annular end surface substantially planar with said second coupling member inner surface.

7. The coupling device as claimed in claim 6, wherein said first and second annular grooves are disposed, respectively, in said first collar element inner annular end surface and said second collar element inner annular end surface, said annular end surfaces abutting each other when said second coupling member is fully engaged within said first coupling member pocket.

8. The coupling device as claimed in claim 1, wherein said first annular groove is substantially square-shaped in cross-section, and said second annular groove is substantially V-shaped in cross-section.

9. The coupling device as claimed in claim 8, wherein said first gasket portion is sized and shaped to fit within said substantially square-shaped first annular groove, and said second gasket portion includes a semi-circular outer curved surface projecting from said first gasket portion for engagement with both surfaces of said V-shaped second annular groove when said first and second coupling members are fully interengaged with each other.

10. The coupling device as claimed in claim 9, wherein said first gasket portion includes a central annular chamber defined therewithin to enable it to collapse to receive said second gasket portion as said second coupling member is being interengaged with said first coupling member, said first gasket portion having sufficient elasticity to rebound and bias said second gasket portion into said second annular V-shaped groove upon complete engagement of said second coupling member with said first coupling member to seal said first and second collar elements.

11. The coupling device as claimed in claim 1, wherein said device further comprises a flat bottom surface and an upper portion that includes a mounting bracket having a mounting aperture for hanging said device.

12. The coupling device as claimed in claim 1, wherein said alignment mechanism comprises a pair of alignment apertures disposed in the upper portions of, respectively, said first and second coupling members, and a single alignment pin, said alignment apertures being coaxial and adapted to receive said alignment pin therethrough only when said first and second coupling members are fully interengaged.

13. A quick-connect coupling device for releasably interconnecting first and second conduit elements, said coupling device comprising:
    a first coupling component having a front surface, a rear surface, an upper portion, a lower portion, a pair of side portions and a first central opening therethrough;
    a first collar portion coaxial with said first central opening and extending outwardly from said first coupling component front surface, said first collar portion having an annular inner end surface;
    a wedge-shaped slot defined in said first coupling component by a pair of sloping shoulders tapering angularly downwardly toward each other from said first coupling component upper portion;
    a second coupling component having a front surface, a rear surface, an upper portion, a lower portion, a pair of side portions and a second central opening therethrough, said side portions being in the form of tapered flanges sized and shaped to fit within said wedge-shaped slot against said sloping shoulders to removably engage said second coupling component within said first coupling component;
    a second collar portion coaxial with said second central opening and extending from said second coupling component rear surface, said second collar portion having an annular inner end surface substantially abutting the annular inner end surface of said first collar portion when said second coupling component is fully engaged with said first coupling component;
    a pair of alignment apertures disposed in the upper portions of, respectively, said first and second coupling components, said alignment apertures being coaxial when said first and second coupling components are fully interengaged;
    a single alignment pin for removable attachment through said alignment apertures to ensure full engagement between said first and second coupling components upon assembly of said device;
    first and second annular grooves disposed, respectively, in the annular inner end surfaces of said first and second collar portions; and
    only one single-piece gasket element disposed in said annular grooves to seal said collar portions and said first and second coupling components upon assembly of said device.

14. The coupling device as claimed in claim 13, wherein said gasket element is sized and shaped for initial positioning in one said annular groove and adapted to engage the other congruent annular groove only when said first and second coupling components are fully interengaged with each other, and wherein said gasket element comprises first and second annular portions each made of a compressible resilient material, said first gasket portion being sized and shaped for initial positioning in one said annular groove with said second gasket portion extending outwardly from said first gasket portion, said second gasket portion being made from a lesser compressible material than said first gasket portion, said second gasket portion being adapted for compression into said first gasket portion as said second coupling component is being engaged with said first coupling component.

15. The coupling device as claimed in claim 14, wherein said first gasket portion is substantially larger in cross-section than said second gasket portion.

16. The coupling device as claimed in claim 14, wherein said first congruent annular groove is substantially square-shaped in cross-section, and said second congruent annular groove is substantially V-shaped in cross-section.

17. The coupling device as claimed in claim 16, wherein said first gasket portion is sized and shaped to fit within said substantially square-shaped first congruent annular groove, and said second gasket portion includes a curved outer surface projecting from said first gasket portion for engagement with both surfaces of said V-shaped second annular groove when said first and second coupling components are fully interengaged with each other.

18. The coupling device as claimed in claim 17, wherein said first gasket portion includes a central annular chamber defined therewithin to enable it to collapse to receive said second gasket portion as said first coupling component is being interengaged with said second coupling component, said first gasket portion having sufficient elasticity to rebound and bias said second gasket portion into said second annular V-shaped groove upon complete engagement of said second coupling component with said first coupling component to seal said first and second collar portions together.

19. The coupling device as claimed in claim 13, wherein said first coupling component includes a central socket disposed about said first central opening and recessed from said wedge-shaped slot, and wherein said first collar portion comprises a cylindrical member having a circumferential annular shoulder disposed at one end thereof, said shoulder being sized to engage said first coupling component central socket and axially terminating in said inner annular end surface.

20. The coupling device as claimed in claim 13, wherein said second coupling component includes a central socket disposed about said second central opening and recessed from said second coupling component front surface, and wherein said second collar portion comprises a cylindrical member having a circumferential annular shoulder disposed at one end thereof, said shoulder being sized to engage said second coupling component central socket and axially terminating in said second collar portion inner annular end surface.

21. The coupling device as claimed in claim 13, wherein said wedge-shaped slot is in the form of a chamber extending into said first coupling component, said chamber being defined by an open top for receiving said second coupling component, said pair of sloping shoulders, a bottom surface, and an inner surface substantially parallel to said first coupling component rear surface, said sloping shoulders and said bottom surface forming, respectively, a pair of elongated side edge lips and a lower rear lip sized to secure said second coupling component into said wedge-shaped slot upon engagement with said first coupling component.

22. The coupling device as claimed in claim 21, wherein the annular inner end surface of said first collar portion is substantially aligned with the plane of said chamber inner surface.

23. A quick-connect coupling device for releasably interconnecting first and second conduit elements, said coupling device comprising:
a female coupling component having a front surface, a rear surface, an upper portion, a lower portion, a pair of side portions and a first central opening therethrough;
a first collar portion coaxial with said first central opening and extending outwardly from said female component front surface, said first collar portion having an annular inner surface; a wedge-shaped pocket defined in said female component by a pair of sloping side shoulders converging angularly downwardly toward each other from an open upper portion, a bottom surface interconnecting the lower ends of said side shoulders, an inner pocket surface extending between said side shoulders, and a substantially U-shaped ledge portion extending along said side shoulders and bottom edge to define an outer surface opening spaced from said inner surface;
a male coupling component having a front surface, a rear surface, an upper portion, a lower portion, a pair of side portions and a second central opening therethrough, said side portions being in the form of tapered flanges sized and shaped to fit within said wedge-shaped pocket cammed against said sloping shoulders to removably engage said male component within said female component, said male component inner surface slidingly engaging said pocket inner surface; a second collar portion coaxial with said second central opening and extending from said male component rear surface outwardly through said female component pocket outer surface opening when said male component is interengaged with said female component, said second collar portion having an inner annular surface substantially congruent with and abutting the inner annular surface of said first collar portion when said male component is engaged with said female component;
a pair of alignment apertures disposed in the upper portions of, respectively, said male and female components, said alignment apertures being coaxial when said male and female components are fully interengaged;
a single alignment pin for removable attachment through said alignment apertures to ensure full engagement between said male and female coupling components upon assembly of said device;
first and second annular grooves disposed, respectively, in the annular surfaces of said first and second collar portions; and
a gasket element disposed in one said annular groove and adapted to directly engage the other congruent annular groove when said male and female components are interengaged with each other, said gasket element having a first annular portion sized and shaped for positioning in one said annular groove and being of a compressible resilient material, and a second annular portion extending outwardly form said first annular portion and being of a lesser compressible material than said first annular portion and adapted for compression into said first annular portion as said male component is being engaged with said female component.

24. The coupling device as claimed in claim 23, wherein said first annular groove is substantially square-shaped in cross-section, and said first gasket portion is sized and shaped to fit within said substantially square-shaped first annular groove, and wherein said second annular groove is substantially V-shaped in cross-section, and said second gasket portion includes a semi-circular outer curved surface projecting from said first gasket portion for engagement with both surfaces of said V-shaped second annular groove when said male and female coupling components are fully interengaged with each other.

25. The coupling device as claimed in claim 24, wherein said first gasket portion includes a central annular chamber defined therewithin to enable it to collapse to receive said second gasket portion as said male coupling component is slidingly interengaged with said female coupling component, said first gasket portion having sufficient elasticity to rebound and bias said second gasket portion into said second annular V-shaped groove only upon complete engagement of said second coupling member with said first coupling member to seal said first and second collar portions and said male and female components together.

26. The coupling device as claimed in claim 23, wherein said first and second collar portions are separate components carried by, respectively, said male and female coupling components.

27. The coupling device as claimed in claim 26, wherein said male and female coupling components each include, respectively, a central socket disposed about said respective first and second central openings, wherein said first collar portion comprises a cylindrical member having a circumferential annular shoulder disposed at one end thereof sized to engage said female coupling components central socket with its annular inner end surface substantially planar with said pocket inner surface, and wherein said second collar portion comprises a cylindrical member having a circumferential annular shoulder disposed at one end thereof sized to engage said male coupling component central socket with its annular inner end being substantially planar with said male coupling component inner surface.

28. The coupling device as claimed in claim 23, wherein said device further comprises a flat bottom surface for selectively mounting said device and attached conduit elements on a ground surface, and an upper portion that includes a mounting bracket having a mounting aperture for selectively hanging said device and attached conduit elements.

29. In a coupling device for releasably interconnecting conduit elements and having a first coupling member with a first central opening therethrough, a second coupling member with a second central opening therethrough, said second coupling member being sized and shaped to slidingly engage said first coupling member, a first collar element coaxial with said first central opening and extending outwardly from said first coupling member, a second collar element coaxial with said second central opening and extending outwardly from said second coupling member in a direction opposite that of said first collar element when said coupling members are interengaged, first and second annular grooves disposed opposite each other about the central openings in said first and second coupling members, and a gasket element having a first and second annular portions and disposed in one annular groove adapted to engage the opposite annular groove when said first and second coupling members are fully interengaged with each other, the improvement comprising: a pressure enhancement device comprising a first duct disposed between the radially inward annular edge of said first coupling member and the bottom surface of the annular groove in said first coupling member, and a second duct disposed between the radially inward annular edge of said second coupling member and the bottom surface of the annular groove disposed in said second coupling member, each said duct being tapered so that the opening thereof at said respective annular groove is smaller than the opposite end opening proximate the radially inward annular edge of said respective first and second coupling member, wherein fluid moving from said first conduit element into said second conduit element creates a pressure through said first duct against said gasket element in the annular groove of said first coupling member to increase sealing pressure between said coupling members, and likewise creates a vacuum in the second duct to further enhance the sealing capability of said gasket element.

30. A coupling device for releasably interconnecting conduit elements, said coupling device comprising:
a first coupling member having a first central opening therethrough;
a second coupling member having a second central opening therethrough, said second coupling member being sized and shaped to slidingly engage said first coupling member;
a tapered pocket defined in said first coupling member to act as a seat for slidingly receiving said second coupling member, said second coupling member being substantially in the form of a wedge to force fit within the tapered pocket to maintain the second coupling member within the first coupling member;
first and second annular grooves disposed opposite each other about the central openings in said first and second coupling members; and
only one single-piece gasket element disposed in one said annular groove and adapted to directly engage the opposite annular groove when said first and second coupling members are fully interengaged with each other, said gasket element having first and second annular portions, said first annular portion being of a first compressible resilient material and sized and shaped for positioning in one said annular groove, and said second annular portion extending outwardly from said first annular portion and being of a second less compressible material than said first annular portion adapted for compression into said first annular gasket portion as said first and second coupling members are being interengaged.

31. The coupling device as claimed in claim 30, comprising a first collar element coaxial with said first central opening and extending outwardly from said first coupling member; and
a second collar element coaxial with said second central opening and extending outwardly from said second coupling member in a direction opposite that of said first collar element when said coupling members are interengaged;
wherein said first and second collar elements are integral components of, respectively, said first and second coupling members.

32. The coupling device as claimed in claim 30, comprising a first collar element coaxial with said first central opening and extending outwardly from said first coupling member; and
a second collar element coaxial with said second central opening and extending outwardly from said second coupling member in a direction opposite that of said first collar element when said coupling members are interengaged;
wherein said first and second collar elements are separate components carried by, respectively, said first and second coupling members.

33. The coupling device as claimed in claim 30, wherein said first coupling member pocket is defined by a pair of sloping side shoulders converging angularly downwardly toward each other from an open upper portion, a bottom surface interconnecting the lower ends of said side shoulders, an inner pocket surface extending between said side shoulders, and a substantially U-shaped ledge portion extending along said side shoulders and bottom edge to define an outer surface opening spaced from said inner surface.

34. The coupling device as claimed in claim 33, comprising a first collar element coaxial with said first central opening and extending outwardly from said first coupling member; and a second collar element coaxial with said second central opening and extending outwardly from said second coupling member in a direction opposite that of said first collar element when said coupling members are interengaged;

wherein said second coupling member comprises an inner surface, an outer surface, and side portions in the form of tapered flanges sized and shaped to fit within said first coupling member pocket cammed against said sloping shoulders to removably engage said second coupling member within said first coupling member, said second coupling member inner surface slidingly engaging said pocket inner surface with said second collar element extending outwardly through said pocket outer surface opening.

35. The coupling device as claimed in claim 34, wherein said first and second coupling members each include, respectively, a central socket disposed about said respective first and second central openings, wherein said first collar element comprises a cylindrical member having a circumferential annular shoulder disposed at one end thereof sized to engage said first coupling member central socket and axially terminating in an inner annular end surface substantially planar with said pocket inner surface, and wherein said second collar element comprises a cylindrical member having a circumferential annular shoulder disposed at one end thereof sized to engage said second coupling member central socket and axially terminating in a second collar inner annular end surface substantially planar with said second coupling member inner surface.

36. The coupling device as claimed in claim 35, wherein said first and second annular grooves are disposed, respectively, in said first collar element inner annular end surface and said second collar element inner annular end surface, said annular end surfaces abutting each other when said second coupling member is fully engaged within said first coupling member pocket.

37. The coupling device as claimed in claim 30, wherein said first annular groove is substantially square-shaped in cross-section, and said second annular groove is substantially V-shaped in cross-section.

38. The coupling device as claimed in claim 37, wherein said first gasket portion is sized and shaped to fit within said substantially square-shaped first annular groove, and said second gasket portion includes a semi-circular outer curved surface projecting from said first gasket portion for engagement with both surfaces of said V-shaped second annular groove when said first and second coupling members are filly interengaged with each other.

39. The coupling device as claimed in claim 38, wherein said first gasket portion is collapsible to receive said second gasket portion as said second coupling member is being interengaged with said first coupling member, said first gasket portion having sufficient elasticity to rebound and bias said second gasket portion into said second annular V-shaped groove upon complete engagement of said second coupling member with said first coupling member to seal said first and second collar portions together.

* * * * *